UNITED STATES PATENT OFFICE.

HENRY H. HAYSSEN, OF NEW HOLSTEIN, WISCONSIN.

OINTMENT FOR GOITER.

SPECIFICATION forming part of Letters Patent No. 418,717, dated January 7, 1890.

Application filed April 29, 1889. Serial No. 309,008. (No specimens.)

*To all whom it may concern:*

Be it known that I, HENRY H. HAYSSEN, a citizen of the United States, residing at New Holstein, in the county of Calumet and State of Wisconsin, have invented a new and useful ointment to be used for the treatment of goiter or thick-neck, also called "bronchocele," as well as for other tumors, without staining, blistering, or pain, of which the following is a specification.

My composition consists of the following ingredients, combined in the proportions stated, viz: iodide of potash, four pounds; vaseline, thirty-two pounds; carbolic acid, one-half pound; oil of lavender, one pound; oil of hemlock, one-half pound; cologne-spirits, one pound; oil of bergamot, one pound. The latter six ingredients are to be thoroughly mixed to a salve. Then add the iodide of potash, previously dissolved in warm water. Then mix thoroughly until of uniform consistency. The iodide may be dissolved in the cologne-spirits.

In using the above-named composition it should be applied twice a day, (morning and evening,) on the parts affected, rubbing it in well with bare hand and washing the parts well every two or three days with castile soap and warm water.

By the use of the above composition according to directions the goiter will at once diminish and may fully disappear in from twenty to one hundred and twenty days, according to the size, age, and severity of tumor, leaving the parts in a healthy and good-looking condition, without wrinkles, scars, or spots.

I am aware that iodine and iodine together with iodide of potash and compounds containing same are being prescribed by physicians. I am also aware that injections with diluted carbolic acid are being administered; but I am not aware that all of the ingredients of my composition, in the proportions stated, have been used together.

My compound is efficient, pleasant, non-staining, non-blistering, painless, fragrant, and harmless, which qualities are the essential points.

What I claim, and desire to secure by Letters Patent of the United States, is—

The herein-described composition of matter to be used for the treatment of goiter and other tumors, consisting of iodide of potash, vaseline, carbolic acid, oil of lavender, oil of hemlock, cologne-spirits, and oil of bergamot, in the proportions specified.

HENRY H. HAYSSEN.

In presence of—
   HENRY TIMMER,
   AUGUST PAULSEN.